Oct. 6, 1931.  F. H. LANDRUM  1,825,745
METHOD AND APPARATUS FOR TESTING SEALED CONTAINERS
Filed June 11, 1928    15 Sheets-Sheet 11
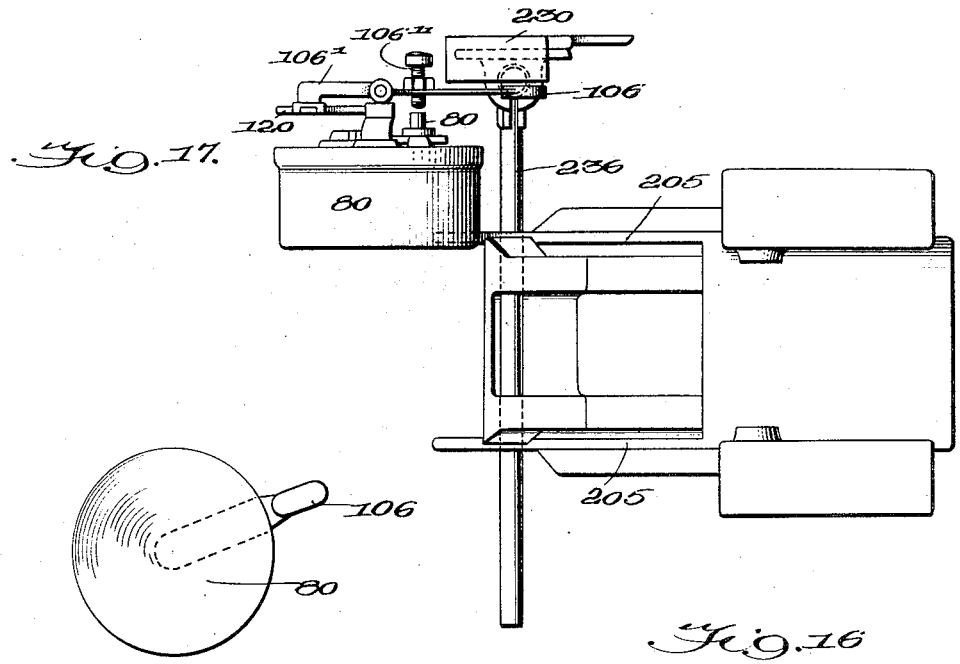
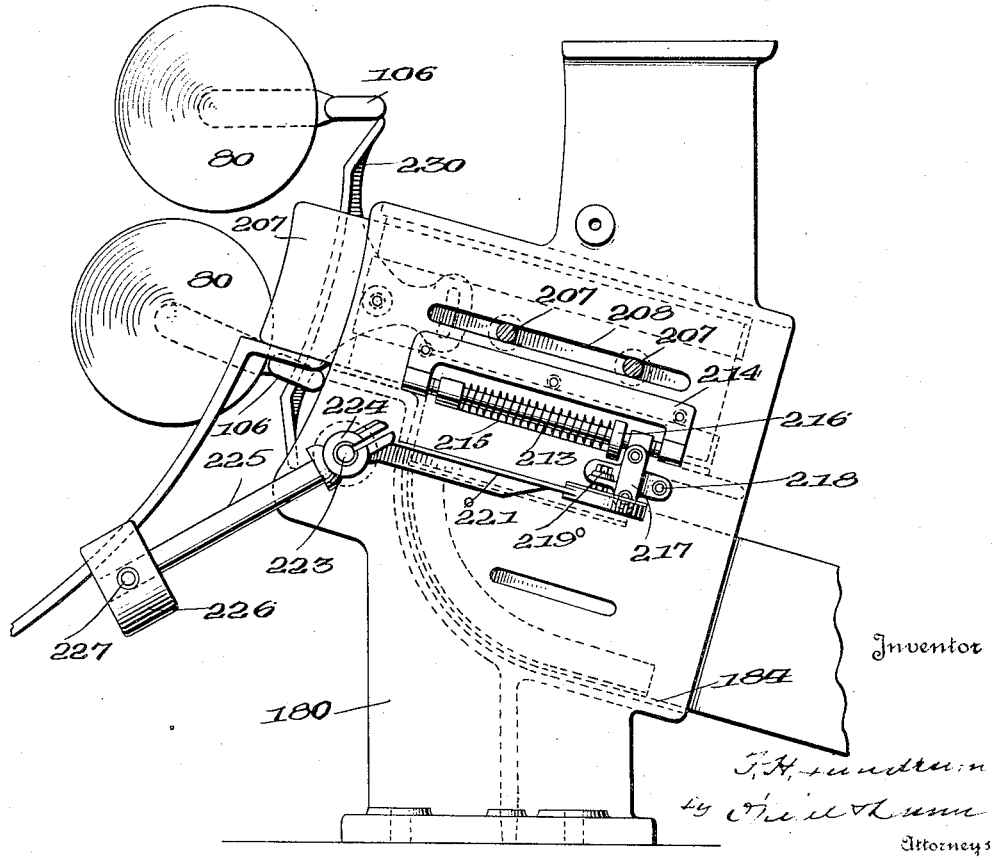
Inventor
F. H. Landrum
by Attorneys

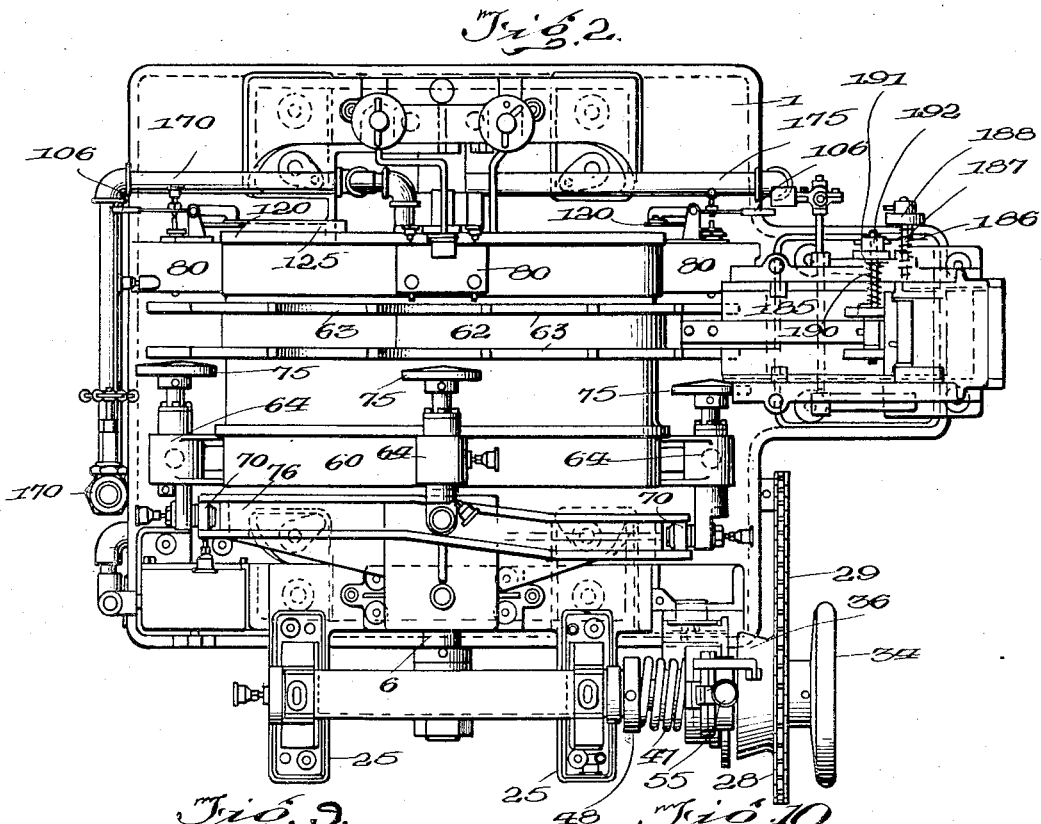
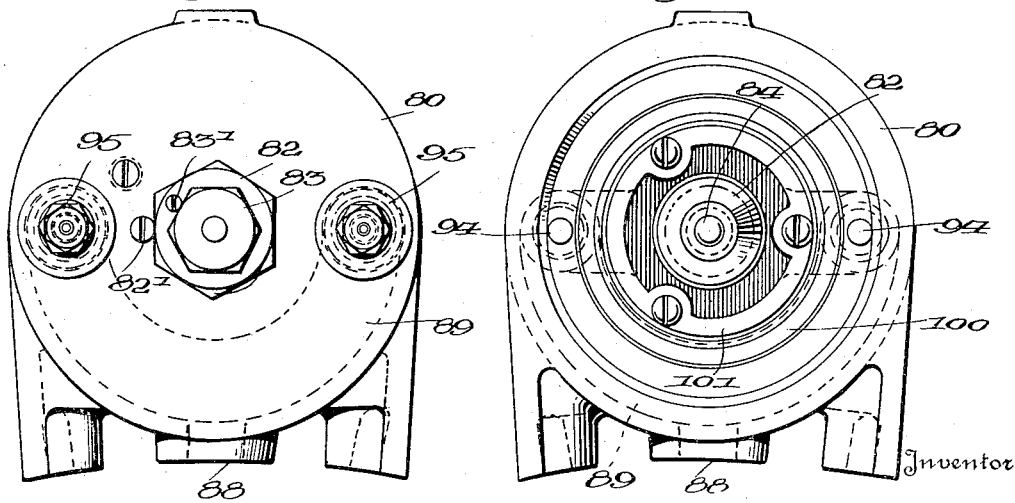

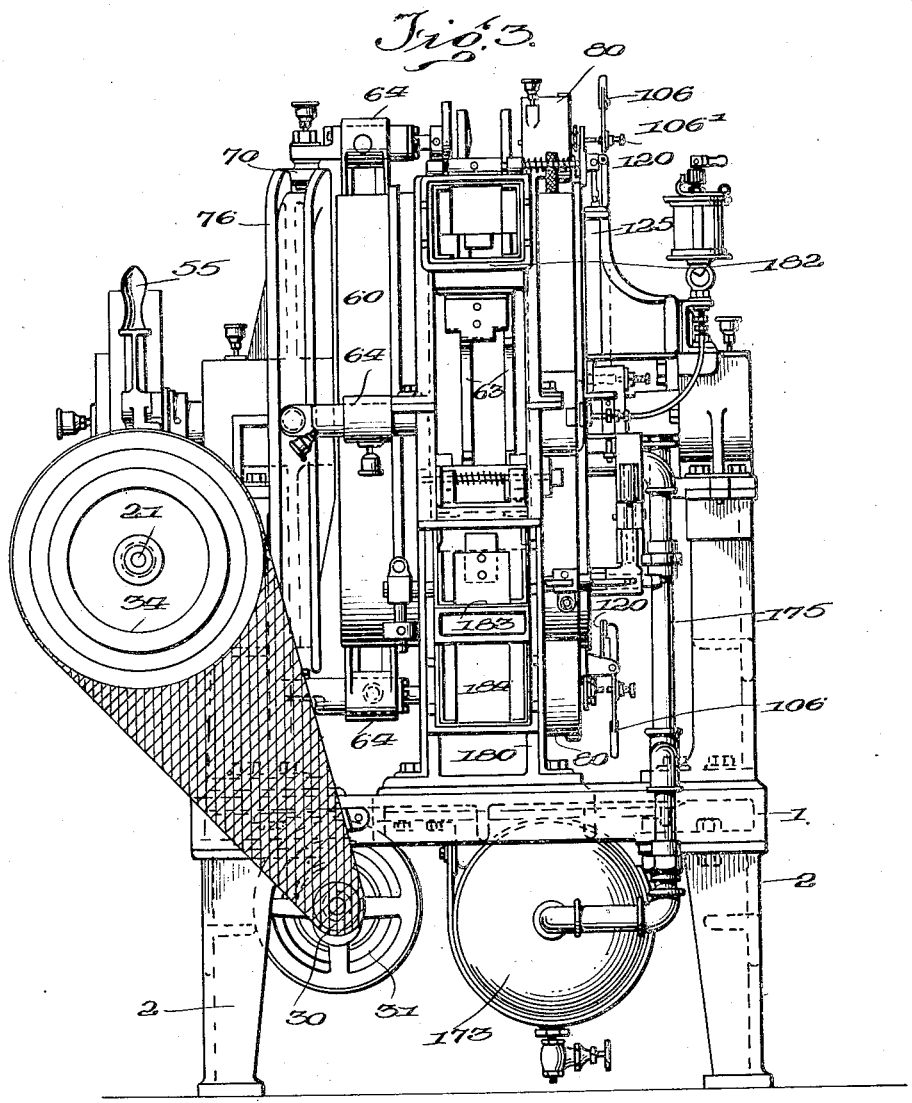

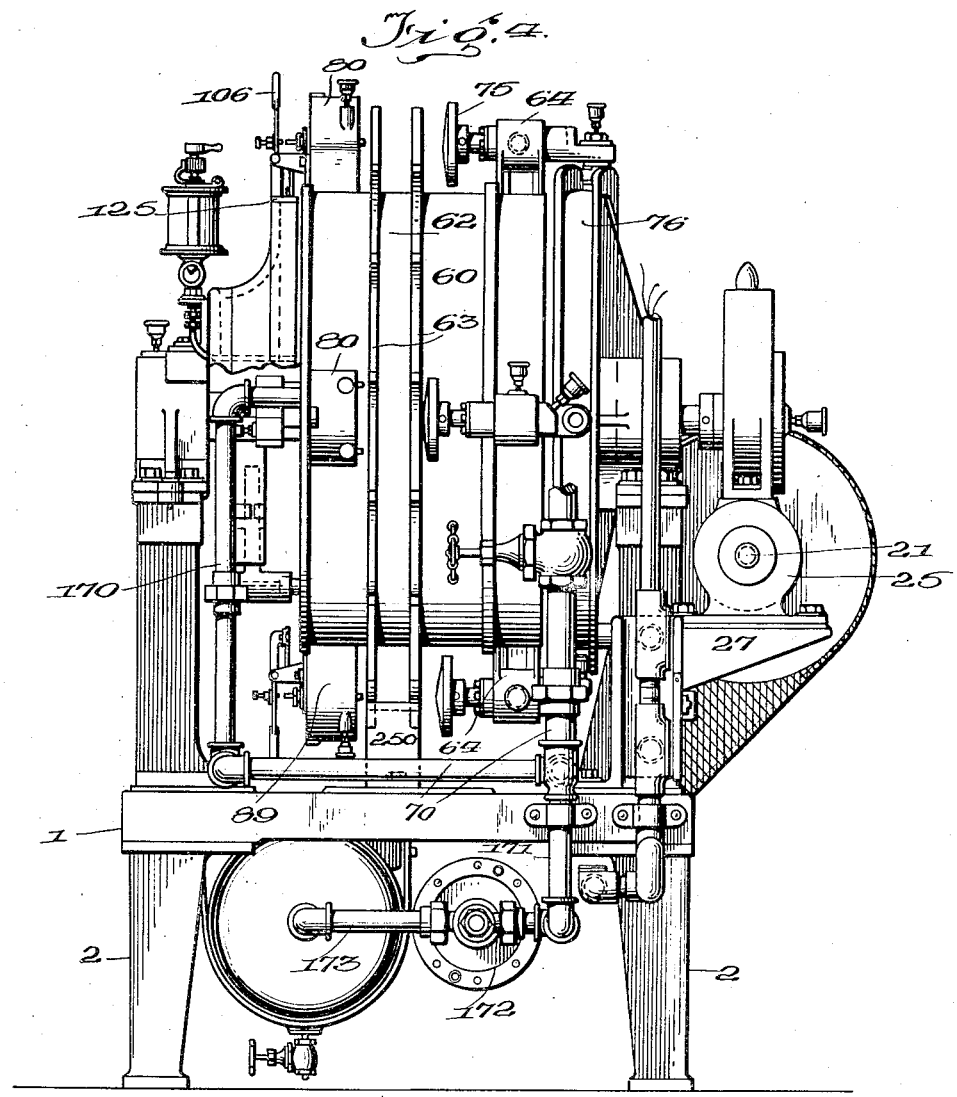

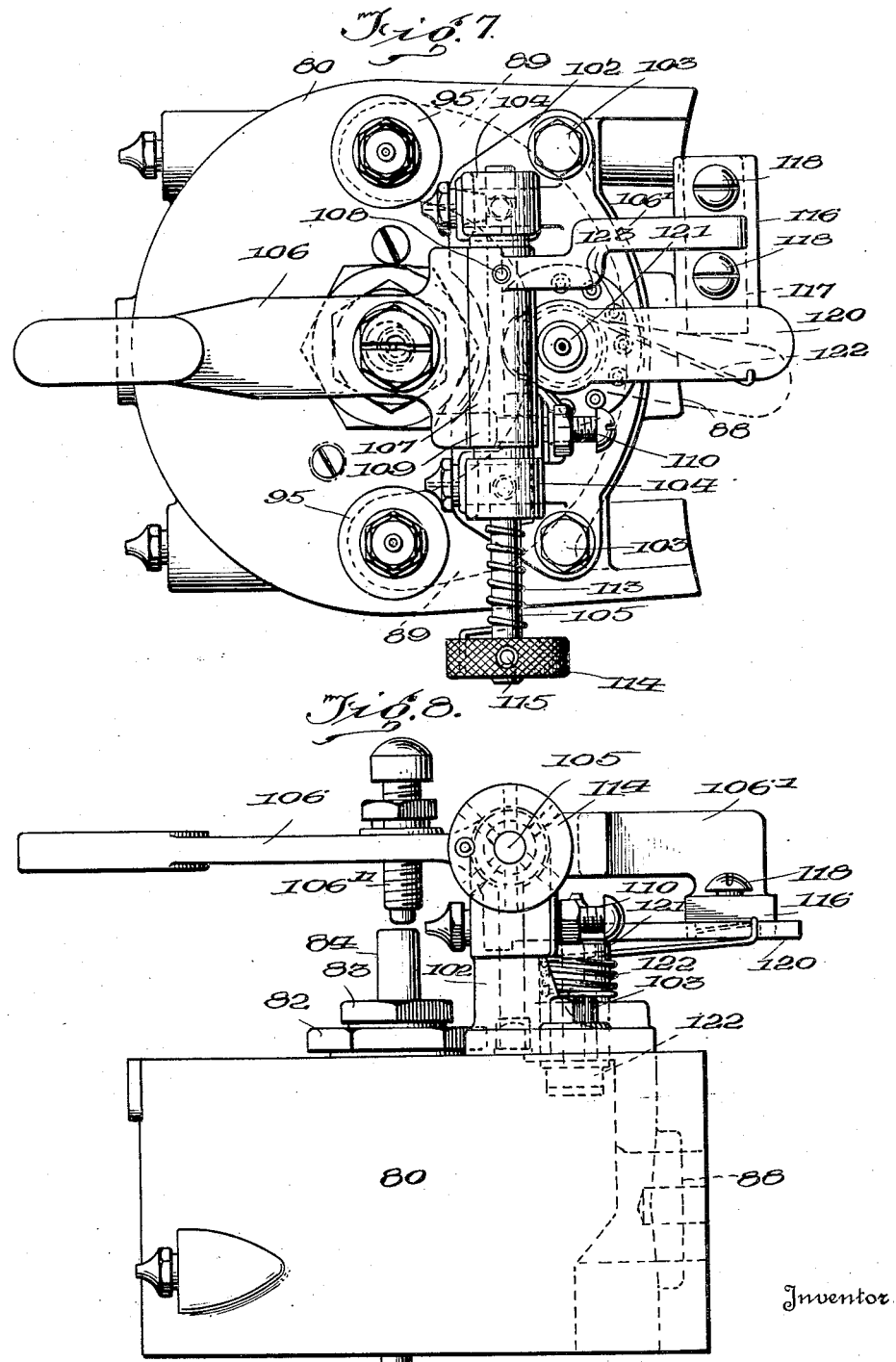

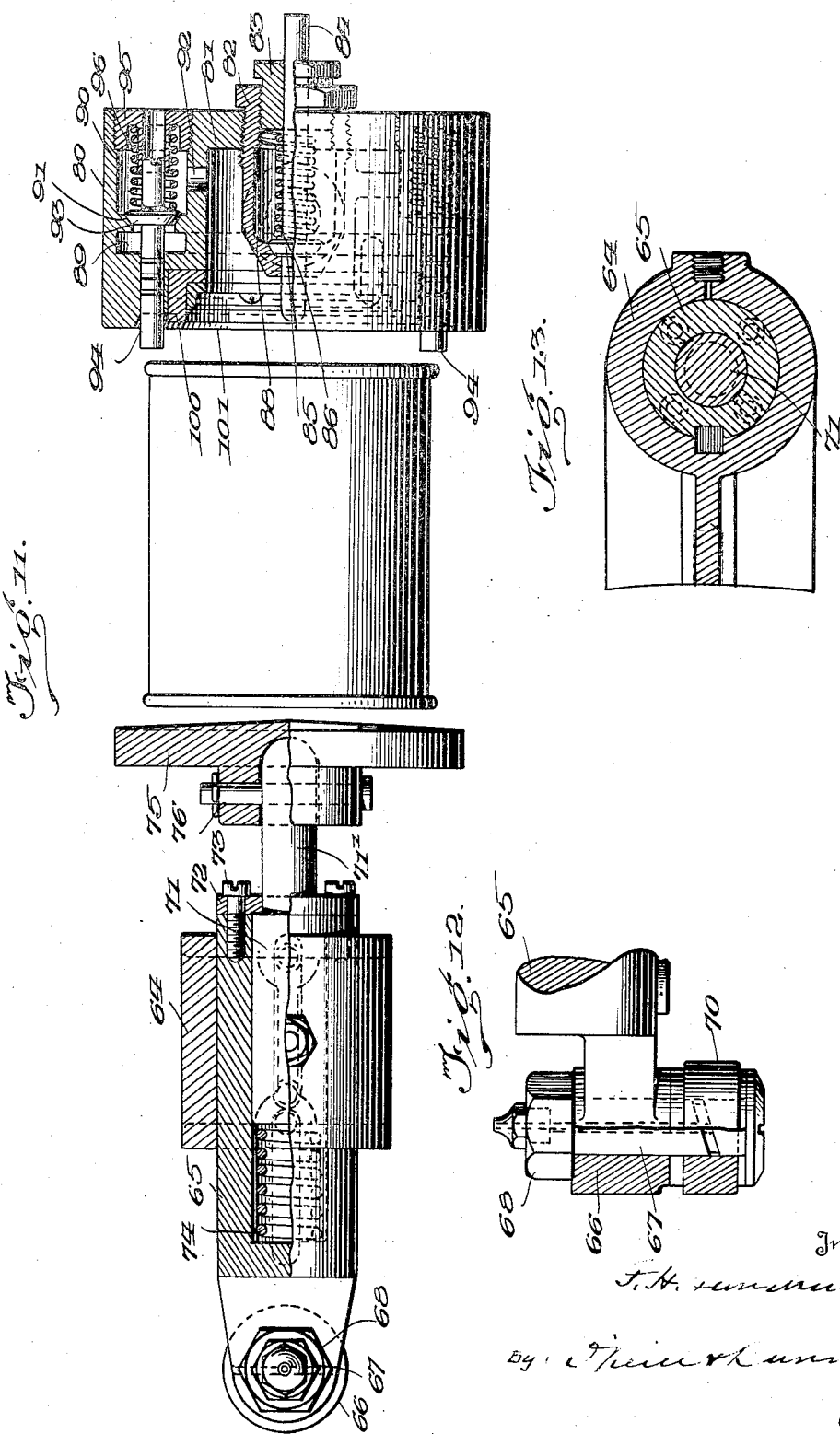

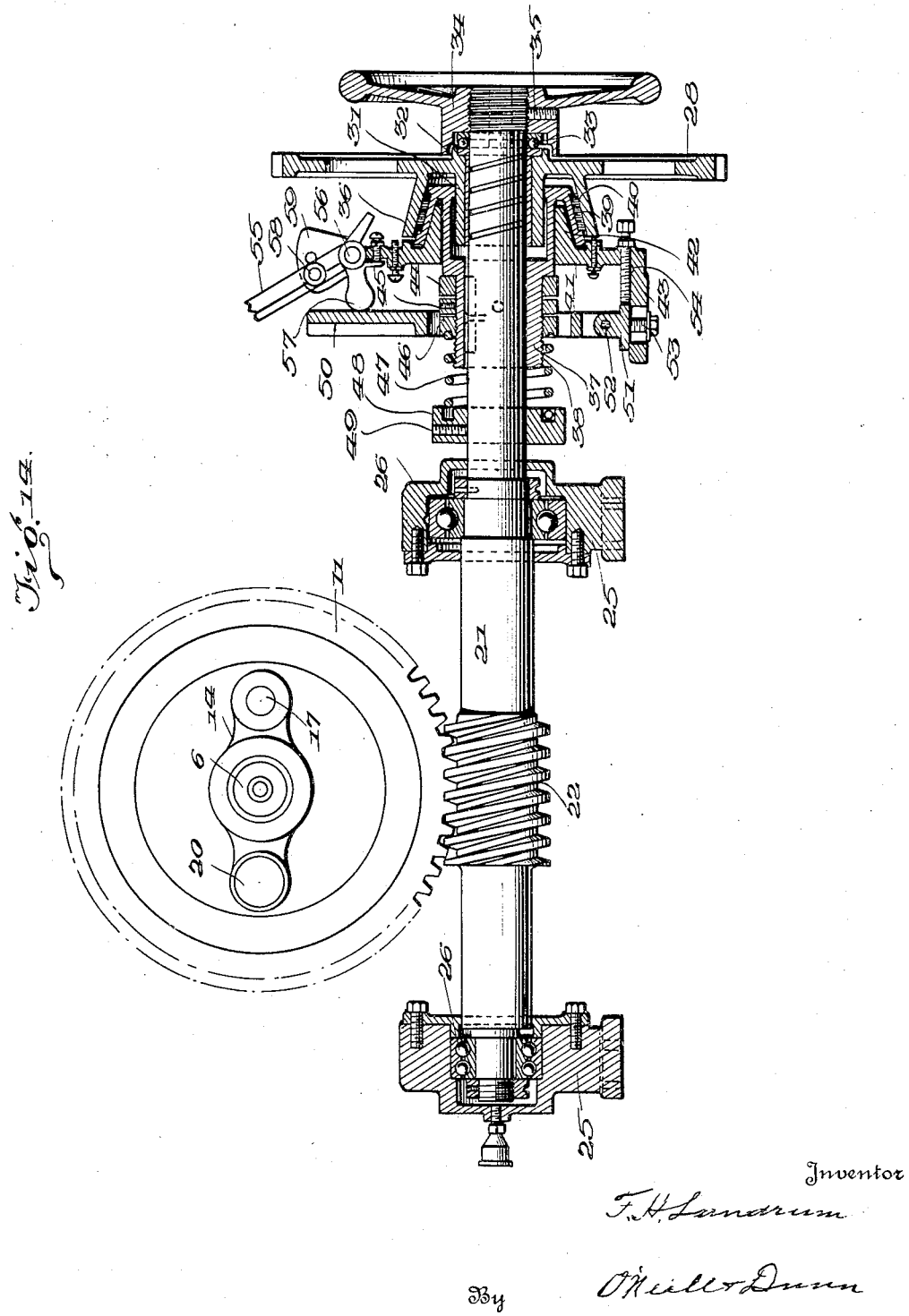

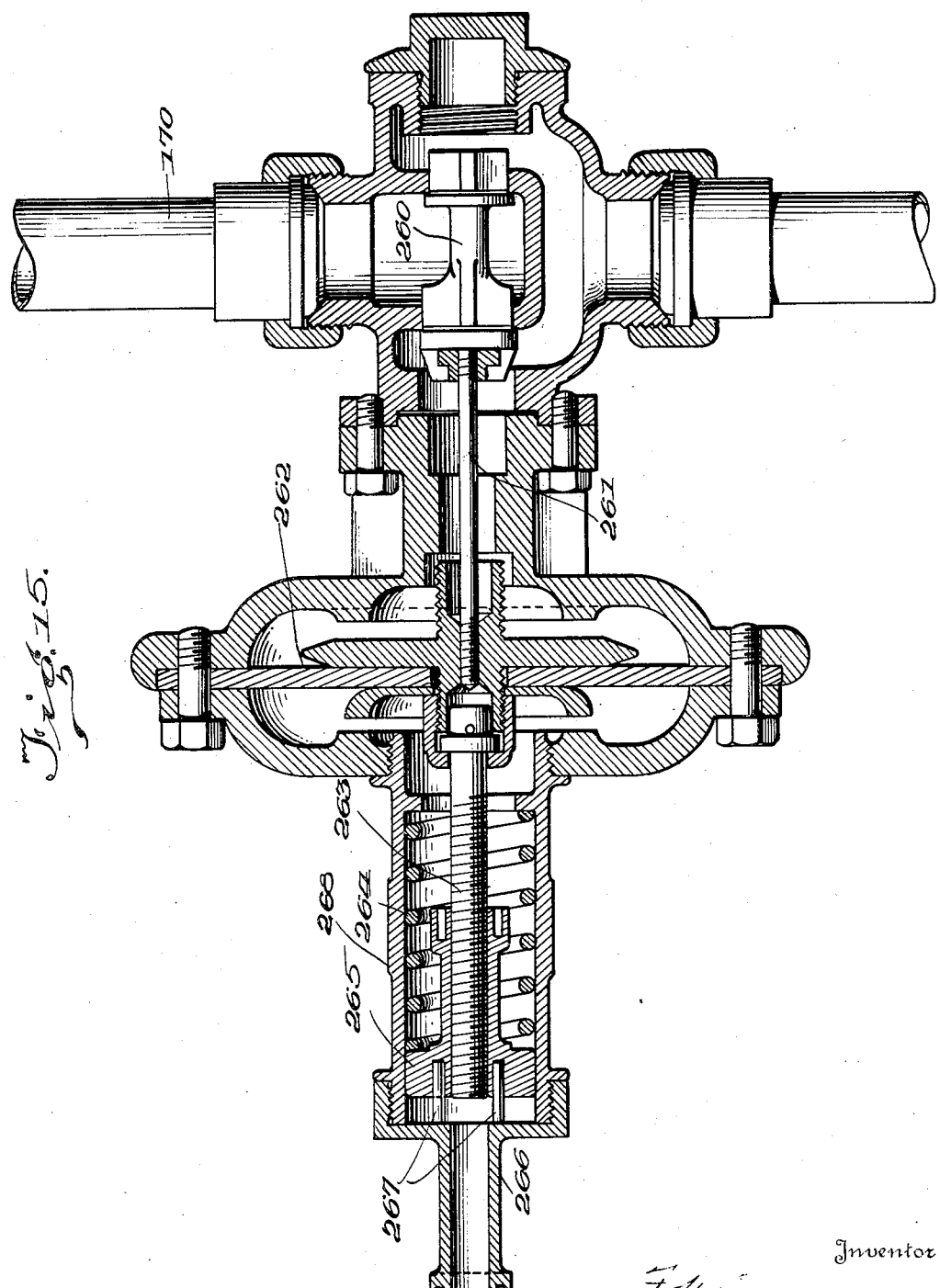

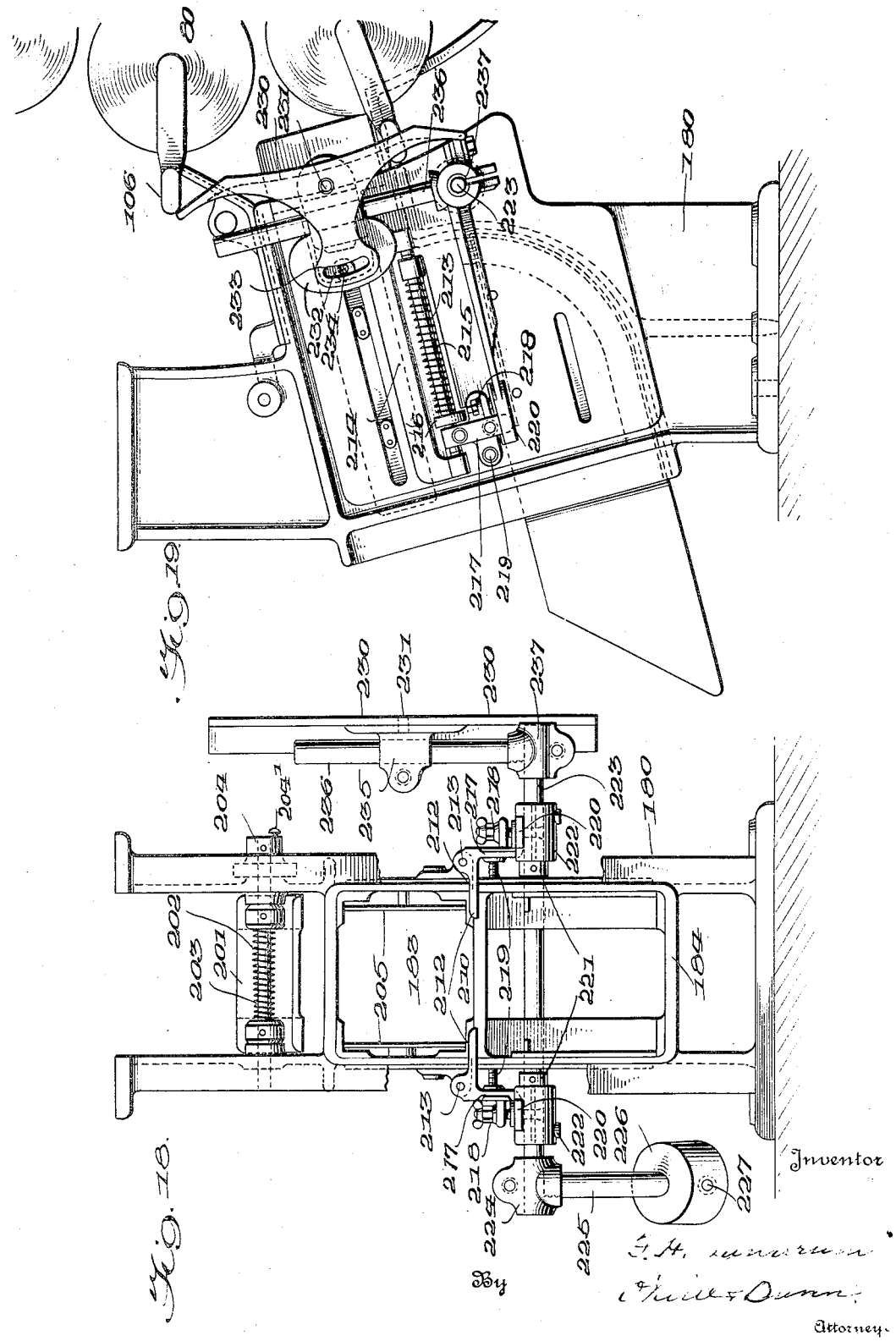

Oct. 6, 1931.  F. H. LANDRUM  1,825,745
METHOD AND APPARATUS FOR TESTING SEALED CONTAINERS
Filed June 11, 1928  15 Sheets-Sheet 13

Inventor
F. H. Landrum
By
Attorneys

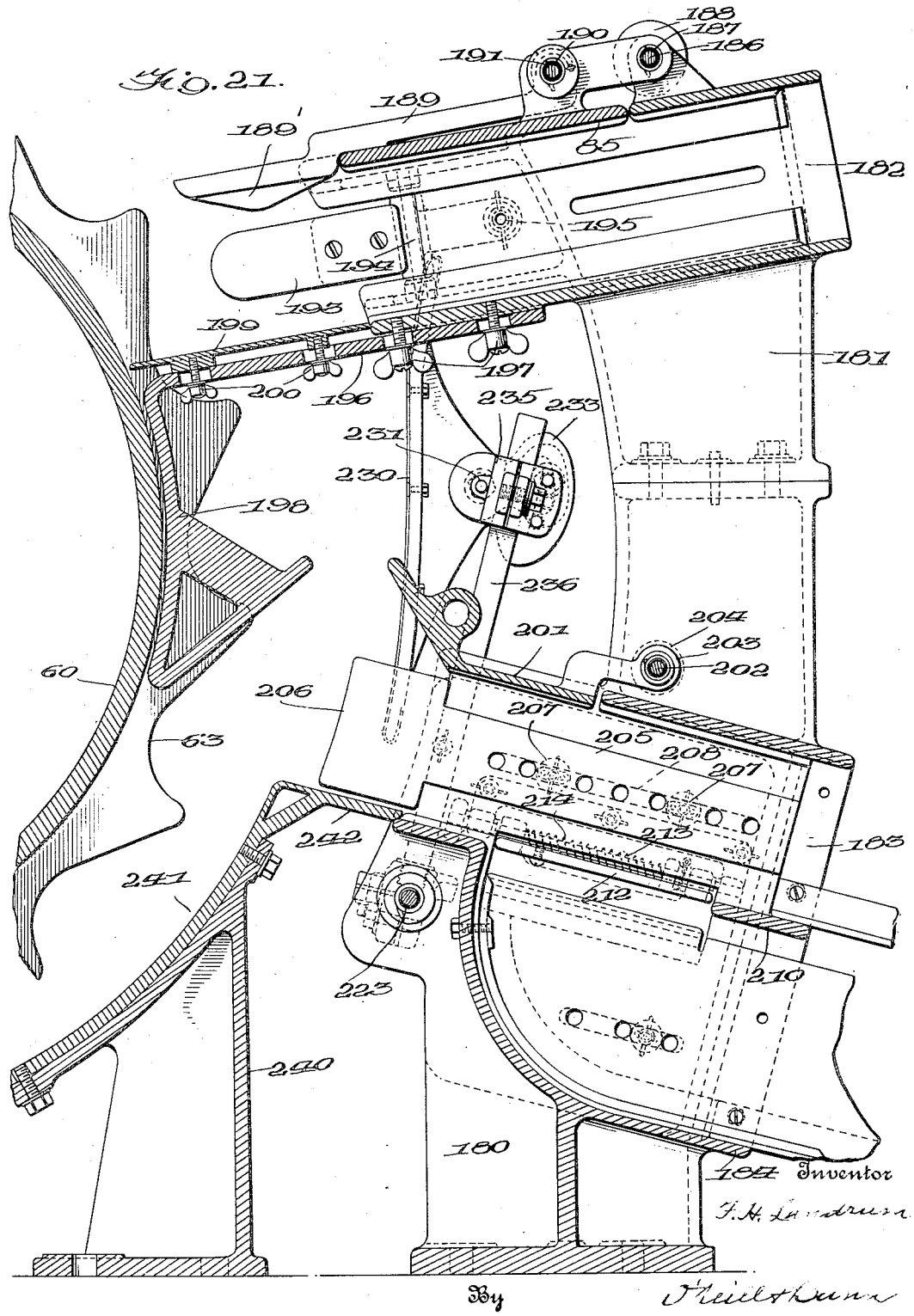

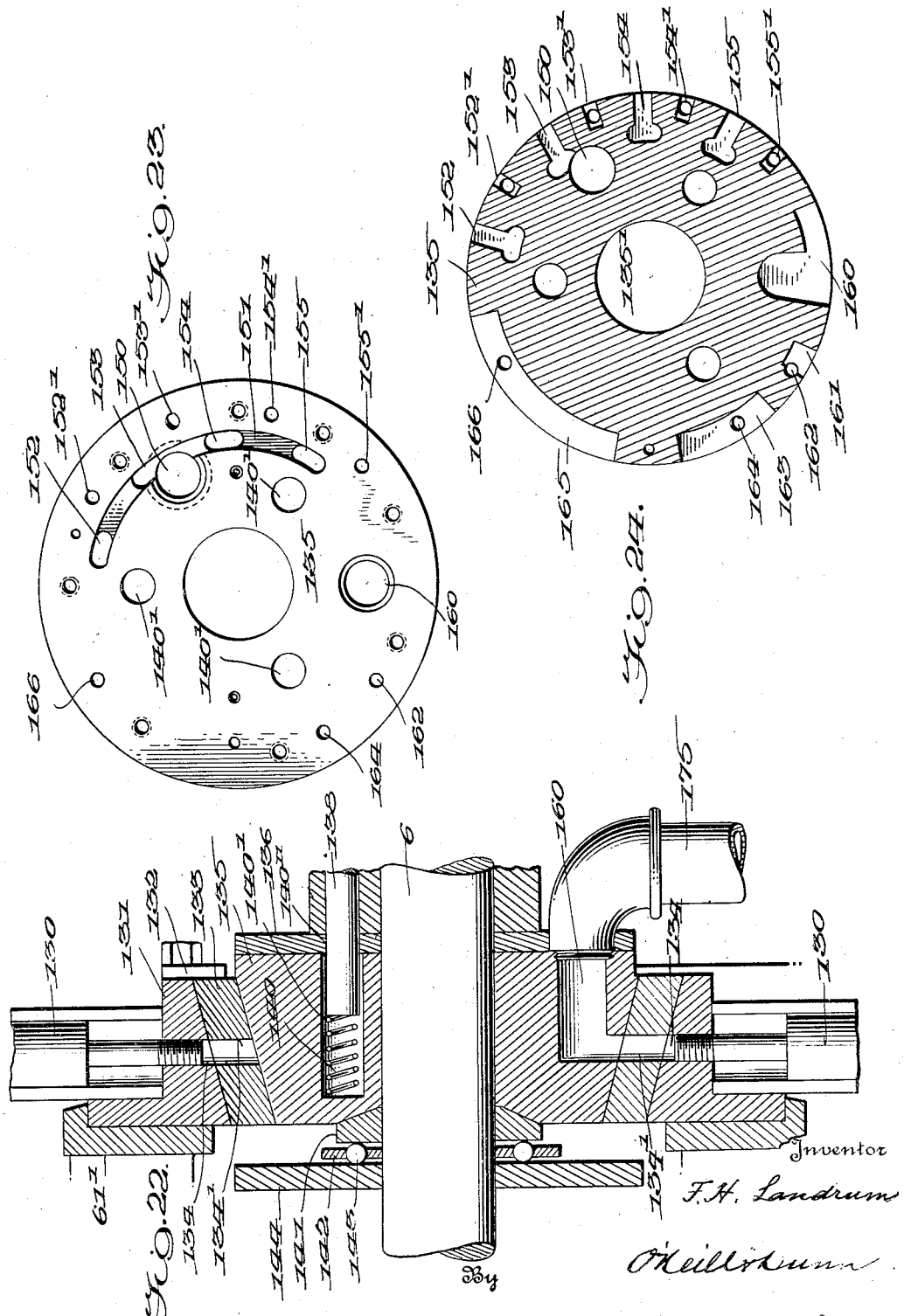

Patented Oct. 6, 1931

1,825,745

UNITED STATES PATENT OFFICE

FRANCIS H. LANDRUM, OF SAN FRANCISCO, CALIFORNIA

METHOD AND APPARATUS FOR TESTING SEALED CONTAINERS

Application filed June 11, 1928. Serial No. 284,355.

The invention relates to an apparatus for testing sealed containers, operating on the general principle of the machines disclosed in my prior applications Serial Nos. 225,133 and 225,134, filed October 10, 1927, the machine being of the same general type as that disclosed in the latter application and presenting certain improvements in structure and operation, first, to standardize the resiliency of the flipping sections of the containers to be tested; second, to provide mechanism of a somewhat more efficient character to segregate the containers deficient in vacuum; and third, to provide a machine as a whole that may be operated at a relatively higher speed than the machines of said copending applications without sacrificing any of the elements of efficiency of the apparatus.

The invention is illustrated in the accompanying drawings, in which:—

Fig. 2 is a plan view of the same.

Fig. 3 is a right side elevation.

Fig. 4 is a left side elevation.

Fig. 7 is a front elevation of one of the vacuum chambers.

Fig. 8 is a side elevation of the same.

Fig. 9 is a view similar to Fig. 7 with certain parts omitted.

Fig. 10 is a rear elevation of one of the vacuum chambers.

Fig. 11 is a side elevation, partly in section, of a testing unit including a vacuum chamber and the reciprocating plunger associated therewith.

Fig. 12 is a fragmentary detail of the plunger.

Fig. 13 is a cross section through the plunger and its support.

Fig. 14 is a detail of the drive shaft and its associated elements, with certain of the parts shown in section.

Fig. 15 is a sectional elevation of the automatic pressure control valve.

Fig. 16 is an enlarged elevation of the discharge chute, including the mechanism for segregating the defective containers.

Fig. 17 is a plan view of the same.

Fig. 18 is a side elevation of the parts shown in Fig. 16, looking into the discharge chute.

Fig. 19 is a rear elevation of the same.

Fig. 21 is an enlarged view similar to Fig. 20, showing the parts in detail and in their relative arrangement.

Fig. 22 is a sectional elevation of the central distributing valve and some of its accessories.

Fig. 23 is a front elevation of said valve.

Fig. 24 is a vertical section through the valve.

Figure 1:
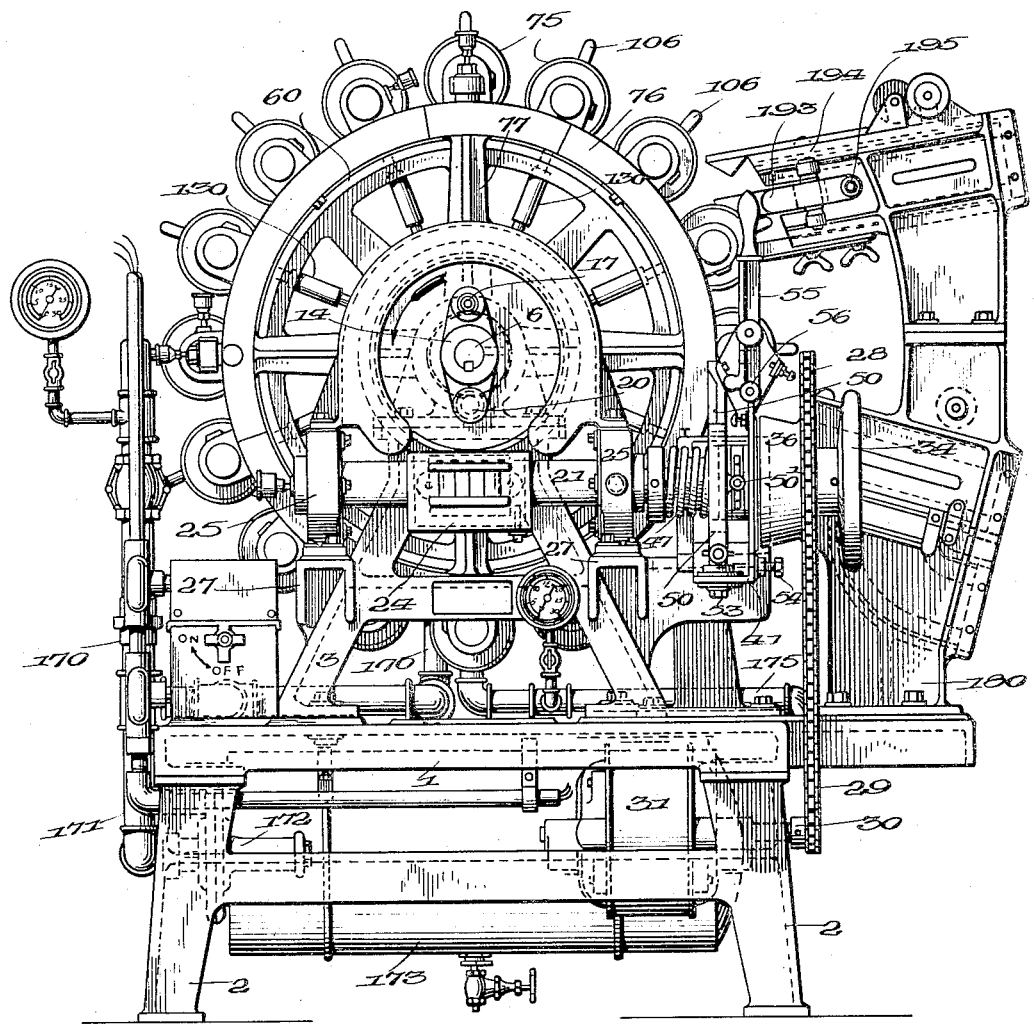
Fig. 1 is a front elevation of the apparatus.

Referring to the drawings, 1 indicates the base plate or table having legs 2, the said base plate constituting a support for the entire apparatus. Secured to the upper face of the base plate 1 are A frames 3 and 3', to the upper portions of which are secured journal housings 4 and 4' in which is supported a horizontal shaft 6, which runs in anti-friction bearings 7 and 8, which are secured within the housings 4 and 4', respectively, the central opening in the housing 4 being closed by a suitable plate 9 to admit of the space about the end of the shaft and the anti-friction bearings being filled with a suitable lubricant. The central opening in the housing 4', through which the end of the shaft 6 extends, is closed by an annular member 10, which likewise seals the opening about the shaft and the anti-friction bearing to provide a lubrication chamber.

Mounted near the outer end of the shaft 6 is a worm wheel 11, which is loosely journalled on a collar or bushing 12, which is secured to the shaft by a set screw 13. Locked to the end of the shaft by a spline or key 15 is a generally elliptical plate 14, connected to the worm gear 11 by means of a shear pin 18, which engages registering bushings 16 and 17 mounted in registering openings in the plate 14 and the web of the worm gear 11, said bushings preferably being of hardened steel, the pin 18 serving to drive the shaft 6 with the worm gear 11, when the latter is rotated, but yielding to shearing stresses imposed by the bushings 16 and 17, when excessive strains are put upon or developed in any part of the apparatus, so that said pin will be sheared and thereby relieve the rest of the mechanism from the damaging stresses.

In order to initiate the rotary movement of the worm gear 11, when the machine is started up and to relieve the shear pin 18 from the heavy starting stresses, the plate 14 carries a relatively heavy spring actuated bolt or pin 20, which is adapted to be moved into engagement with a socket or recess in a plug 19 fixed to the hub or web of the worm gear 11, said bolt or pin being manually engaged with the socket of the plug 19, when the machine is to be started, and being automatically retracted from such engagement, when released by the hand of the operator after the machine has been started.

The worm gear 11 is driven by a worm 22 secured to a transverse shaft 21 journalled in anti-friction bearings 26, which, in turn, are mounted in housings 25 secured to brackets 27 carried by the A frame 3.

The construction and arrangement of the shaft 21 and its accessories is illustrated in detail in Fig. 14. Journalled on the bushing 31 on the outer end of the shaft is a sprocket 28, which, as shown in Figs. 1 and 3, is driven by a chain 29 engaging the relatively small sprocket 30 on the shaft of an electric motor 31, which latter is secured to the under face of the table 1. On the extreme outer end of the shaft is a hand wheel 34 threaded to the shaft and locked thereto by a set screw 35 with an anti-friction bearing interposed between the hub of the hand wheel 34 and the hub of the sprocket 28. The inner face of the sprocket 28 is provided with a flange 36, which forms one member of a friction clutch by means of which the sprocket is engaged with and drives the shaft 21. The cooperating clutch member 39 is formed on the end of sleeve 37 slidable upon but rotatable with the shaft 21, the engaging face of the clutch member 39 being provided with a friction band 40. Mounted on the sleeve 37 is a collar 44, which abuts a shoulder on said sleeve and is confined against longitudinal movement by a collar 45 locked to the shaft by a suitable set screw. The collar 44 is connected by a clevis pin 50', indicated in Fig. 1, supported in a yoke frame 50, which is pivoted at its lower end on a pin 52 supported in a bracket 51, adapted to be locked in position by a bolt 53 engaging a slot in the horizontal portion of the bracket 43 secured to the A frame 3, said bracket having an enlarged opening through which the shaft 21 and the sleeve 37 extend, the opening being surrounded by a conical flange 42, which is adapted to be engaged by the interior conical face of the clutch member 39 on the sleeve and serve as a brake when the members of the clutch are disengaged.

An internally threaded collar 46 engaging screw threads on the inner end of the sleeve 37 serves as an adjustable abutment for a helical spring 47 surrounding the shaft, the other end of which spring engages a collar 48 locked to the shaft by a set screw 49, said spring normally tending to force the members of the clutch, carried by the sprocket 28 and the sleeve 37, respectively, into engagement. Pivotally mounted on the fixed bracket 43 is a hand lever 55, which, through shaft or pintle 56, actuates a cam member 57 engaging the face of the yoke frame 50, the handle constituting a clutch lever for engaging and disengaging the members of the clutch, the said lever or handle being provided with a spring catch 58 adapted to engage openings in a plate 59 on the bracket 43, said bracket being provided with suitable set screws to limit the movement of the clutch lever 55. When the clutch lever is moved to its right hand position in Fig. 14, the cam 57 tends to move out of engagement with the yoke frame 50 and the spring 47 forces the sleeve 37 longitudinally of the shaft, so that the clutch member on the end of said sleeve engages the clutch member on the sprocket 28 and the shaft is connected to the motor 31 and driven by the latter, the degree of frictional contact between the clutch members being accurately regulated by adjusting the tension of the spring 47 either by collar 49 or collar 46. If the clutch handle 55 is moved to vertical position, the clutch member 39 on sleeve 37 is in neutral position and either sprocket 28 or the shaft 21 may be rotated independently of each other. When, however, the clutch lever 55 is moved to its extreme left hand position, as indicated in Fig. 14, the clutch member 39 on the sleeve engages the braking flange 42 on the bracket 43 and locks the shaft against rotation, leaving the sprocket 28 free on the shaft.

Splined to the shaft 6 is a hollow cylindrical drum 60 having a central hub and spider 61, the exterior surface of the drum being provided with a series of receptacle receiving and supporting pockets, disposed in circumferential order, which pockets may be formed either as integral portions of the drum or as separate elements in the form of a sectional ring 62 provided with arcuately notched flanges 63 spaced at regular intervals to constitute the pockets substantially conforming to the contour of the cans or other receptacles to be tested. The arrangement and disposition of the pockets is such as to accurately position the containers with reference to the testing apparatus.

Secured to the peripheral face of the drum in axial alignment with the several pockets 63 are vacuum chambers 80, which are shown in detail in Figs. 7 to 13, inclusive. Each vacuum chamber comprises a generally cylindrical casting adapted to be secured to the peripheral face of the drum by bolts passing through holes in the drum and engaging threaded openings in the legs or bosses on the casting 80. Each chamber 80 is provided with a bottom opening bounded by an inwardly tapering rim within which opening is secured a sealing washer or gasket 100 of rubber or the like, which is held in position by a ring 101, which, in turn, is fastened about the inner peripheral edge of the opening in the casting by suitable screws. The gasket 100 and the chamber 80, as illustrated, are shaped to conform to the particular type of container to be tested, and, in the specific embodiment of the invention illustrated, the machine is adapted to operate on containers having flexible closure elements, as illustrated in Fig. 11, in which case the gasket 100 is ring-shaped and is of a size and contour to engage as near the periphery of the closure of the container as possible, the function of the gasket being to seal the top of the container in air type relation with the vacuum chamber.

Formed within the body of the vacuum chamber is a semi-circular duct 89, which communicates with an inlet duct 88 in the rear wall of the vacuum chamber. Also formed within the body of the chamber 80 are two valve chambers 90, 90 communicating with the respective ends of duct 89 through ports surrounded by valve seats 91, the upper portions of the valve chambers being connected to the open center of the vacuum chamber by ports 92, 92. Cooperating with the valve seats 91 are pin valves 93, the lower end of the stems 94 of which extend beyond the inner face of the vacuum chamber adjacent the gasket 100. The upper end of the stem of each pin valve is guided in a socketed plug 95 threaded into the top of the vacuum chamber and each valve is held to its seat by a helical spring 96, the tension of which may be regulated by adjusting the plug 95. Preferably the plug is hollow and is closed by a suitable cap, which permits access to the valve for cleaning, grinding and lubrication.

Threaded in the outer face of the vacuum chamber 80 is a cage 82, in which is mounted for reciprocatory movement, a pin 84, the lower end of which is guided in a suitable opening in the lower end of the cage, the upper end being guided in an adjustable nut 83 threaded into the end of the cage and serving to regulate the pressure exerted by the helical spring 86 surrounding the pin 7 and confined between an abutment 85 on the pin and the inner end of the nut 83, said abutment limiting the movement of the pin toward the open face of the vacuum chamber. The relative position of the extreme lower part of the pin 84 with reference to the opening in the lower face of the vacuum chamber may be regulated by adjusting the cage 82 axially of the vacuum chamber, as will be understood. Both the cage 82 and the nut 83 may be locked in their adjusted positions by means of studs or bolts 82' and 83', respectively, as indicated in Fig. 9, thereby preventing accidental displacement of the cage or variation in the force exerted by the spring 86 on the pin 84.

Mounted on the front face of the vacuum chamber adjacent the cage 82 is a casting 102, secured in position by suitable bolts 103, said casting including journal bearings 104, 104 in which is mounted a shaft 105. Secured to the shaft 105 is a lever 106 having an elongated hub 107 surrounding the shaft, which is connected to the latter by a pin 108, said lever having an extension 106' terminating in a horizontal bracket 116 to which is secured by screws 118 a stop or abutment 117 preferably formed of steel or the like, which extends beyond the lower face of the bracket and constitutes the means for locking the lever 106, under conditions to be hereinafter explained. The rocking movement of the lever 106 is limited in one direction by an abutment 109 formed on the hub or barrel 107, with which cooperates an adjusting set screw 110 mounted in a lug or extension on the bracket 102. The abutment 109 is normally held in engagement with the stop or screw 110 by means of a helical spring 113 which surrounds the shaft 105, with one end engaging an opening in journal bearing 104 and the other end engaging an opening in a knurled handle 114, which is secured to the outer end of the shaft 105 by a suitable set screw 115, said handle 114 being thus adjustably connected to the shaft to permit the tension on the spring to be regulated to the necessary degree to effect the return of the lever 106 to its normal position without, however, requiring the application of much force to rock the lever 106 in its journal bearings as a necessary concomitant of the testing operations, as will be hereinafter more particularly set forth. Mounted on the lever 106 in alignment with the pin 84 in the vacuum chamber is an adjustable set screw 106", which is provided with a suitable lock nut to hold it in adjusted position, so that, when the pin 84 is projected outwardly, it will engage the set screw 106" and rock the lever 106 in its bearings causing the outer end 106' of said lever to be depressed.

Mounted on the bracket 10' is a boss 121, which constitutes a bearing for a lock finger 120 which cooperates with the abutment plate 117 secured to the bracket 116 on the end 106' of lever 106, the lock finger being normally held in engagement with the abutment plate 117 by means of a spring 122, one end of which engages the outer end of said lock finger, the helical body portion of the spring surrounding the boss 121 and the other end of the spring engaging one of a circular series of holes 123 in the base of the boss provided to permit adjustment of the tension of the spring.

Figure 5:
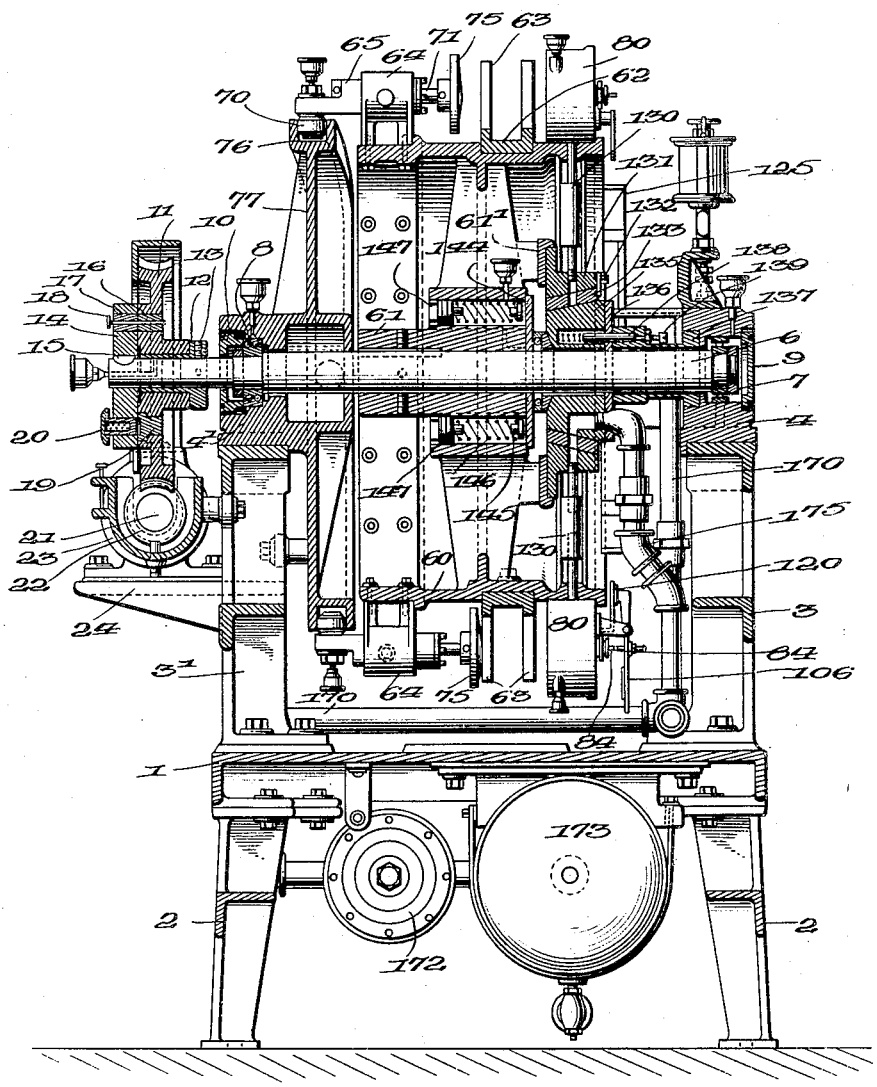
Fig. 5 is a transverse sectional elevation through the middle of the machine.

Secured to the periphery of the drum 60 in axial alignment with the pockets 63 and the vacuum chambers 80 is a series of plungers, each adapted to engage a receptacle carried in a corresponding pocket and to move the receptacle in the pocket until the closure end of said receptacle is in sealing engagement with the gasket 100 carried by the cooperating vacuum chamber. These plungers are identical in construction and are illustrated in detail in Figs. 11, 12 and 13. Each of the plunger elements includes a cylindrical bearing block 64 provided with legs by means of which it is bolted to the periphery of the drum, as shown in Fig. 5. Slidably mounted in the bore of the bearing block 64 is a hollow plunger member 65 in which is telescopically mounted a plunger member 71 having a reduced outer portion 71', the member 71 being retained within the hollow member 65 by means of a collar 72 secured by bolts 73 to the outer edge of the member 65. The member 65 is held against rotation in the bearing block 64 by means of a spline or key, as indicated in Fig. 13. A helical spring 74 mounted in the hollow member 65 tends to force the latter outward until it is arrested by engagement with the collar 72, the spring being designed to yield under excessive pressure to prevent damage to the mechanism and also to compensate for any variations in the heights of the containers being tested. Secured to the end 66 of the member 65 is a bearing pin 67, which is locked in position by a nut 68 and is provided with a roller 70 preferably fitted with suitable wear washers, as indicated in Fig. 12. Fixed to the end of the plunger section 71' by a cross pin 76 is a circular table-like element 75, which is adapted to engage the adjacent end of a container carried by the corresponding pocket 63 on the drum, when the plunger is actuated to force the closure end of the container into sealing engagement with the gasket 100 on the corresponding vacuum chamber 80.

Preferably formed as an integral part of the housing 4' is a circular cam track 76 having a grooved periphery in which the rollers 70 of the plunger elements engage, said cam track having a low section extending substantially throughout the first half of its periphery and a high section for the remainder of its periphery, so that the plungers will be moved toward the vacuum chambers as these elements approach the upper limit of their rotary movement with the drum and the plungers will be moved in the opposite direction away from the vacuum chambers at or about the time the plunger and vacuum chambers reach the lower limit of their rotary movement with the drum.

Secured to an annular seat 61' formed on the spider of the drum is an annular valve casing 131, which is illustrated in detail in Figs. 5, 22, 23 and 24. The interior of the casing has a frusto-conical bore in which is accurately fitted a bushing 133, secured to the casing by bolts and clips 132, the bushing having a bore similar to that of the casing in which the central conical distributing valve 135 fits. Both the casing 131 and the bushing 133 are provided with aligning ports 134 and 134', respectively, as more particularly illustrated in Fig. 22, and each of the ports in the casing 131 is connected to the inlet port 88 of the corresponding vacuum chamber 80 by piping 130.

The distribution valve is of the full floating type and comprises a tapered plug 135, provided with a central opening through which the shaft 6 passes and abuts a thrust collar 141 having a conical or curved face engaging a complementary recess in the valve, said collar engaging an anti-friction bearing 142, 143, which, in turn, is acted upon by the annular thrust plate 144, which latter is engaged by plungers 145 mounted in openings in the hub of the drum, each plunger being acted upon by a helical spring 146 mounted in the opening in the hub, the tension of the spring being adjusted by a screw plug 147 engaging the threaded interior of the opening, as more particularly shown in Fig. 5. This coordination constitutes an anti-thrust compensating means for the valve plug 135 and, when properly adjusted, supports the valve in its casing, so that the casing may be revolved with the drum without danger of the stationary valve plug sticking in the casing. Formed in the outer face of the valve plug 135 are pockets 140' to receive compensating springs 140 and locking pins 138, by means of which the plug is held against rotation and with the proper degree of pressure within its rotary casing to prevent leakage between these parts. The pins 138 are carried by a collar or sleeve 137 having a perforated flange at one end in which the pins are slidably mounted, said flange carrying set screws 130, by means of which the pins 138 are adjusted to regulate the tension of the springs 140. The sleeve or collar 137 is provided at its other end with an exteriorly threaded flange which engages a threaded opening in the housing 4. It will be seen, therefore, that, by accurately adjusting the compressive effects of springs 140 and 146 to exactly compensate each other, the valve 135 will be supported within the casing with a full floating effect and at the same time will be maintained in fluid tight engagement with the casing. The valve proper is provided with a cover plate 136 secured to the outer face of the valve by screws, which cover plate has openings therein registering with openings in the front face of the valve.

The valve 135 is provided with a threaded opening 150 at one side of the center, which is connected by suitable piping 170 with a fluid pressure pump, not shown, which is designed to reduce the pressure in the several vacuum chambers 80 as connections between the vacuum chamber and the central valve 135 are successively established, as will be hereinafter set forth. The port or opening 150 communicates with an arcuate channel 151, which, in turn, is connected to ports 152, 153, 154 and 155 opening through the side of the valve body and adapted to be brought into registry successively with the openings 134' in the valve bushing, therefore serving to establish communication between the vacuum chambers 80 and the fluid pressure exhaust pump. Between the ports 152, 153, 154 and 155 and beyond the latter port is a series of ports 152', 153', 154' and 155', in circumferential alignment with the ports 152, 153, 154 and 155, which are also adapted to be brought into registry with the openings 134' in the bushing and successively establish communication between the vacuum chambers 80 and the atmosphere, after each operation of reducing the atmospheric pressure within the vacuum chambers is effected by way of ports 152, 153, 154 and 155 successively, said ports 152', 153', 154' and 155' opening through the front face of the latter to the atmosphere, as indicated in Fig. 23.

Formed in the valve 135 and near the lower portion thereof, when the valve is in position, is a port 160, which is adapted to be connected by piping 175 with a tank 173 suspended from the under face of the table 1, which tank is connected to the fluid pressure or exhaust pump by a conduit 171, which includes a pressure reducing valve 172 by means of which a constant predetermined fluid pressure below that of the atmosphere may be maintained in the tank 173. The port 160 extends through the front face of the valve 135, where it is connected to the piping 175 leading to the tank 173, to the lateral face of the valve where said port is adapted to register with the openings 134' in the bushing 133 and, therefore, to establish communication between the vacuum chambers 80 successively and the tank 173, thereby developing in each of the vacuum chambers a predetermined reduction of pressure below that of the atmosphere. An additional series of ports 161, 163 and 165 in the lateral face of the valve 135 and in alignment with the ports in the bushing are adapted to successively establish communication between the vacuum chambers and the atmosphere by way of openings 162, 164 and 166 communicating with the respective ports 161, 163 and 165.

From the foregoing description of the valve in its various parts and connections, it will be apparent that as the drum 60 is rotated on a horizontal axis, the several vacuum chambers 80 will be first alternately put in communication with the exhaust pump and the atmosphere through ports 150 to 155', inclusive, so that successive reductions and restorations of atmospheric pressure will be applied to the closures of the containers which are in sealed relation with the several vacuum chambers, the reduction in atmospheric pressure within the vacuum chambers being sufficient to cause all of the closures of the containers to flip outwardly, the closures of defective containers in which the degree of internal vacuum is deficient or otherwise, the internal pressure is excessive, remaining permanently distended or bulged, while the closures of receptacles containing a normal degree of vacuum or reduced pressure will be flipped outwardly and inwardly successively, the purpose being to substantially standardize the resiliency of the metal of the closures, so that all of the closures will flip under the same uniform reduction of pressure, as will be more particularly hereinafter explained. The function of port 160 is to establish communication between the vacuum chambers at a predetermined point of their travel, and the tank 173, so that the final or testing reduction of pressure is applied to the closure elements of each container in order to segregate the defective containers from those that are satisfactory. The ports 161, 163 and 165 are designed to successively establish communication between the vacuum chambers and the atmosphere, to restore the normal atmospheric pressure within the vacuum chambers, to permit the seal between the vacuum chambers and the container closures to be broken, so that the containers will be free to be delivered to the discharge chute.

In order to render the locking fingers 120, on the vacuum chambers 80, inoperative to lock the levers 106 when the latter are rocked by the successive bulging or flipping of the ends of the closures, there is provided an arcuate cam or track 125 supported by a bracket attached to the housing 4 with which the locking fingers 120 engage and thereby rock to inoperative position against the tension of the respective springs 122, during the preliminary flipping operations. Fig. 7 shows one of the locking fingers 120 moved to inoperative position, as indicated in dotted lines, out of operative relation with the abutment plate 117 carried by the extension 106' of the lever 106.

Figure 6:
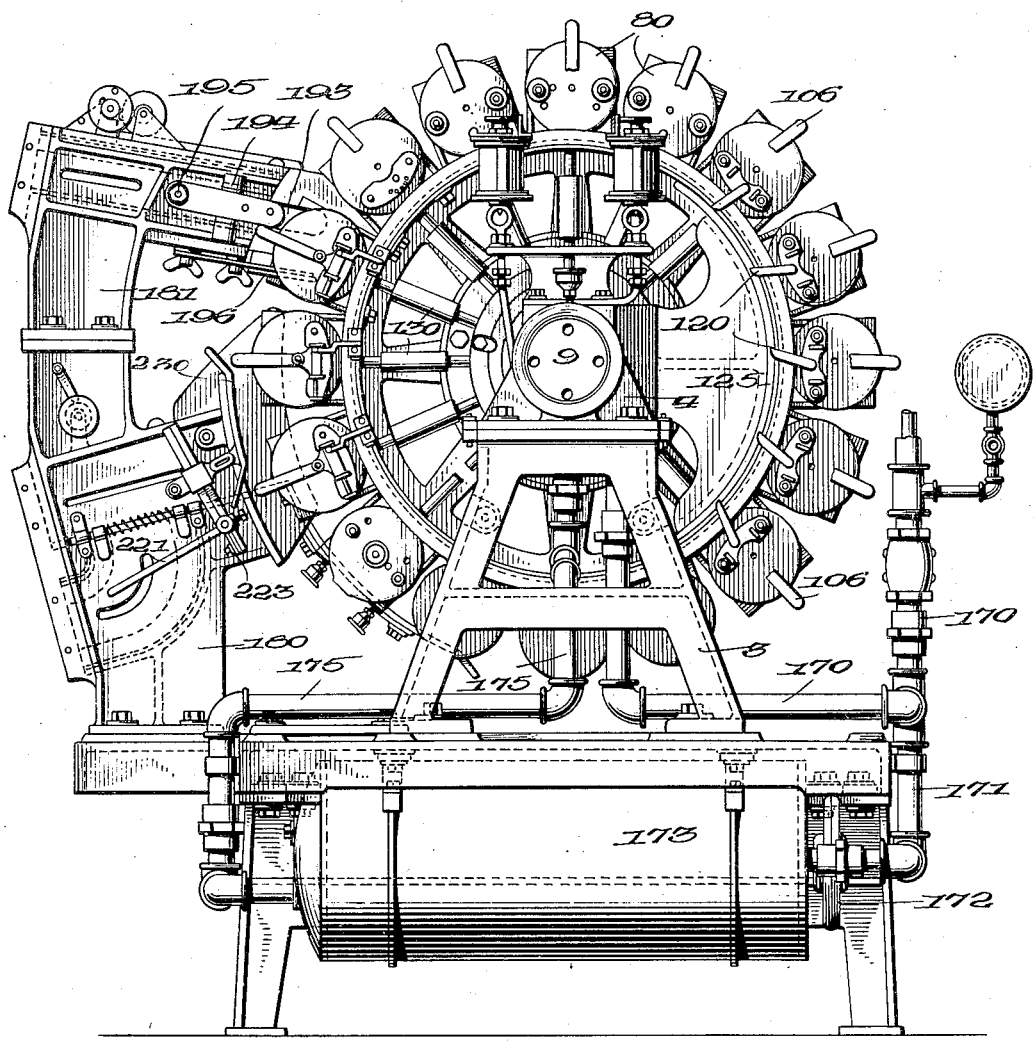
Fig. 6 is a rear elevation.

The machine is provided with an automatic inlet for the containers, which is located above the outlet at one side of the machine, so that the feed and discharge chutes of the containers are conveniently accessible for adjustment and repair. The general relation of the feed and discharge chutes to the other parts of the mechanism is clearly indicated in Figs. 1 and 6 and the structural details of the feed and discharge chutes and the mechanism for segregating the defective containers in the discharge chute are shown in Figs. 16 to 21, inclusive, in which 180 indicates a casting containing the two branches of the discharge chute, 183 and 184, respectively, and upon the top of said casting is mounted a second casting 181 with which the feed chute 182 is integrally formed, the casting 180 being secured to the top of the table or base plate 1, so that the supply and discharge chutes are in substantial alignment with the pockets 63 carried by the drum 60.

The supply chute 182 is provided with a cover 85 at its rear, which is hinged to an integral top section of the chute by a shaft 186 surrounded by a helical spring 187 anchored at one end to the cover and at the other end to an adjusting knob or handle 188 by means of which the tension of the spring may be regulated to retain the cover in closed position.

Hinged to the cover 85 by a shaft 190, similarly provided with a tension spring 191 and adjusting knob 192, is an arm 189 extending longitudinally of the mid section of the cover and terminating in a lug or abutment 189', which extends downwardly into the chute for a short distance and serves to prevent more than one container at a time being discharged from the chute, so that the containers will be fed sequentially to the pockets 63 of the drum 60.

The chute is also provided with side guides 193 hinged on pintles 194 to the sides of the chute and held in proper adjusted position to accurately position containers in the chute for delivery into the pockets of the drum, by means of adjusting studs 195 mounted in the side walls of the chute, passing through the rear ends of the side guides, and provided with inner and outer lock nuts. Secured to the bottom of the chute 182 is a bridge piece 196, which is adjustably attached to the chute by means of winged bolts 197, as clearly shown in Fig 21. The end of the bridge piece adjacent the drum is provided with a bracket-like extension 198, which projects between the flanges on the drum forming the pockets 63 and terminates in an angular guide member which serves to direct the containers into the mouth of the discharge chute. Adjustably attached to the top of the bridge piece 196 is a wear plate 199, locked to the bridge piece by means of bolts 200 engaging slots in the bridge piece.

The automatic outlet for containers is provided with a double chute housing, as hereinbefore explained, the upper chute 183 having an opening in its bottom which communicates with the lower discharge chute 184, with an automatic gate interposed in the opening between the two members of the discharge chute for the purpose of segregating the defective containers from those that are normal or satisfactory, as will be hereinafter explained. The top of the outlet chute 183 is provided with a cover 201 mounted on shaft 202, which is provided with a spring 203, one end of which is fixed to a collar fast to the shaft and the other end secured to the cover, so that the latter is held in closed position by the tension of the spring. The spring tension may be adjusted by a knob 204, which is locked in position by a pin 204' engaging a socket in the side wall of the chute casting. Secured to the inner walls of the discharge chute section 183 are side guides 205, which are adjustable both longitudinally and laterally by means of bolts 207, as shown in Fig. 21, the side guides terminating in enlarged portions adjacent the inlet end of the chute 183, which extend over the ends of the containers discharged from the pockets of the drum and guide the containers accurately into the discharge chute. Mounted upon a bracket 240 secured to the table top or base plate 1 is an arcuate guide 241 terminating in a bridge piece 242, which abuts the inner end of the discharge chute 183, the abutment 198, the arcuate guide 241, the bridge piece 242, and the side guides 206 mutually cooperate to deliver the containers from the drum into the upper discharge chute 183, so that the containers will be in proper position to roll down said chute and either be discharged from the outlet end thereof or delivered into the lower discharge chute 184, as the case may be, and as will be hereinafter explained.

The opening in the bottom of the upper discharge chute 183, which gives access to the lower discharge chute 184, is of sufficient size to permit the container rolling along the bottom of the upper discharge chute to pass therethrough, when the gate mechanism, which partially closes said opening, is retracted. This gate mechanism comprises two plate-like members 212 hinged on shafts 213 supported in bearing brackets 215 attached to the sides of the chute casting 180, the members 212 normally projecting through openings in the side walls of the chute casting and constituting continuations of the tracks of the upper discharge chute 183. Each shaft 213 is provided with a helical spring 214, one end of which is fixed to the shaft by means of an adjusting collar 216, the other end being fixed to the hinge member of the corresponding gate section 212, the springs serving to keep the gates 212 in normal or horizontal relation to form continuations of the bottom of the trackway of the upper chute section 183. One of the hinge members of each gate section is provided with a bracket-like extension 217, which carries a set screw or adjusting stud 218, which constitutes an abutment for a locking lever 220, which holds the corresponding gate in closed position. Each bracket member 217 also carries a set screw 219 adapted to abut the adjacent side wall of the chute and serves to hold the gate in horizontal position, as will be understood upon reference to Figs. 18 and 19. The locking levers 220, which serve to hold the gates locked in horizontal position and, therefore, to effectively close the opening between the upper discharge chute member 183 and the lower discharge chute member 184, are provided with hub members 222, which are locked to a cross shaft 223 journaled in the side walls of the chute casting 180, the shaft being held against longitudinal movement by collars 221 which are pinned to the shaft. Fixed to one end of the shaft is a clamp 224 in which is threaded an arm 225 carrying on its outer end an adjustable counterweight 226, which is adjustably fixed to the arm by a set screw 227, the counterweight serving to rock the shaft so that the levers 220 are held in engagement with the set screws 218 carried by the respective gate members 212 and therefore hold the gate members in horizontal relation.

Fixed to the opposite end of the shaft 223 is a clamp 237, which carries an upwardly extending rod 236. Adjustably mounted on the rod 236 is a screw clamp 235, which carries a plate 232 upon which is adjustably mounted a contact shoe 230, adapted to be engaged by the trip lever 106 of any vacuum chamber with which a defective container is engaged. The abutment is pivoted to 232 upon a pin 231 and is locked in proper adjusted position to effect a wiping contact with the ends of the levers 106, when the latter are projected into engaging relation with the face of the abutment, by means of a set screw 234 carried by the plate and engaging an arcuate slot 233 in a rearward extension of the abutment, as shown in Fig. 19. The particular coordination of the abutment 231 with its support enables said abutment to be accurately adjusted both as to height and inclination to effect a continuous wiping contact between the face of the abutment and the end of all levers 106 carried by the vacuum chambers 80, which have been projected outwardly by defective containers and locked in said projected position by the corresponding locking fingers 120 also carried by the vacuum chambers, thereby causing the abutment to rock shaft 223 and swing the lock levers 220 out of engagement with the gate members, permitting the latter to be moved downward against the tension of their supporting springs when a defective container enters the upper chute section 183 and passes onto the gate members, so that all of such defective containers will drop into the lower discharge chute member 184 and be discharged therefrom.

Figure 20:
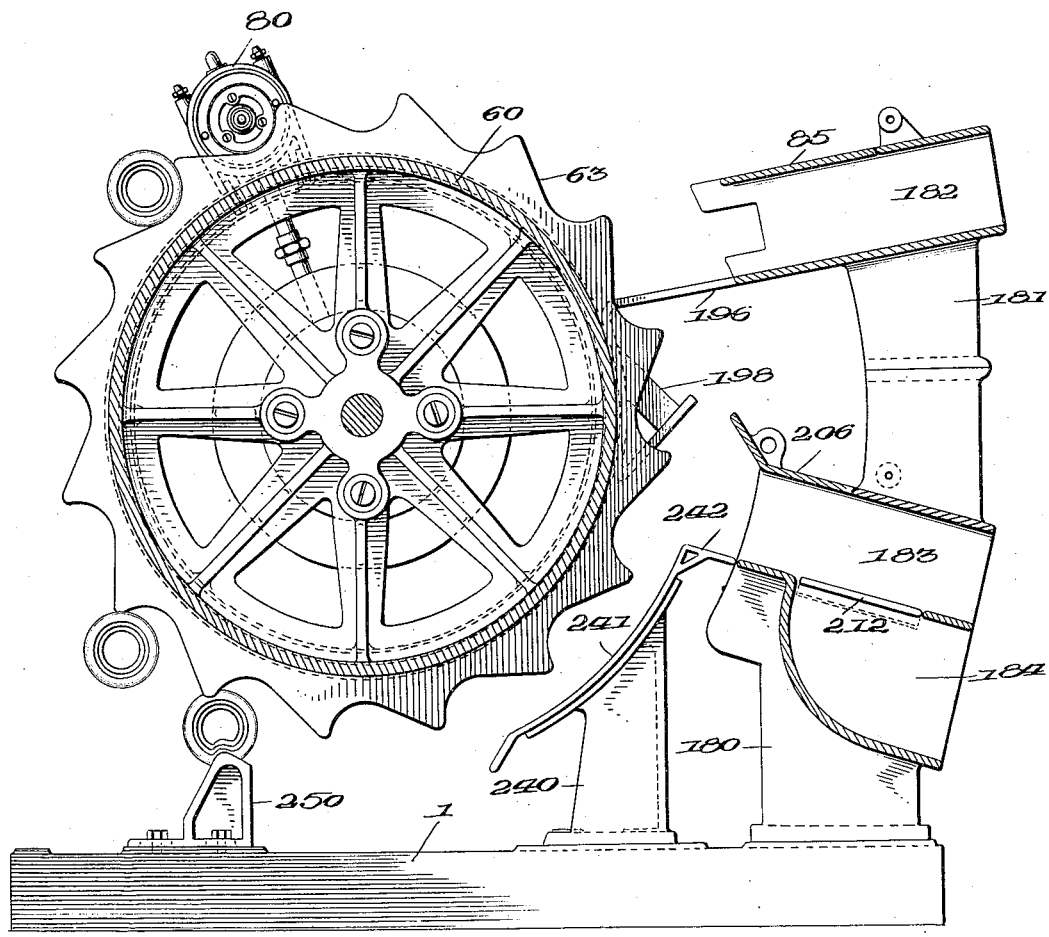
Fig. 20 is a more or less diagrammatic sectional elevation of the drum and the feed and discharge chutes.

In the event that a container is not properly positioned within its supporting pocket 63 on the drum 60, or, in case any container is displaced from its proper position in such pocket, a stop 250 is secured to the top of the base plate or table 1, as shown in Fig. 20, which engages such container and is effective to stop the machine by arresting the rotation of the drum and causing the pin 18 to be sheared. The stop is located in an accessible position, so that the can caught between the same and the drum may be readily removed by the operator. This expedient is desirable in order to prevent any containers, which may be out of normal position in the pockets, damaging the arcuate guide 240 or the mechanism of the discharge chute.

The automatic pressure control valve is preferably of the type shown in Fig. 15, involving a balanced valve 260 connected by a stem 261 to a diaphragm 262, which, in turn, is acted upon by a spring 264 in a housing 268, the spring being interposed between an abutment on the interior of the housing and an adjustable collar 265 in threaded engagement with a screw stem 263, connected to the diaphragm and the valve stem 261, the tension of the spring 264 being regulated by adjusting the collar 265 on the stem 263 by means of the pins 267 carried by a bonnet-like end extension 266. This particular pressure regulating device is purely exemplary and may be substituted by any other satisfactory form of apparatus to effect the same purpose.

The apparatus as described is adapted to automatically test containers of foodstuffs or the like under optimum conditions of speed and efficiency and to automatically segregate containers which are defective or deficient in internal vacuum conditions from those having normal internal vacuum or a reduced internal pressure within certain prescribed limits, the containers having flexible wall sections, in the present instance, the end closures, which are moved a certain amount under the application of differential pressures within and without the container. For purposes of illustration, the following conditions are indicated: It is assumed that a normal container of the character stated has an internal vacuum equal to seven inches of mercury, and that a force approximately equivalent to four inches of vacuum applied to the flexible section or end closure of the container is necessary to cause such flexible section to move outwardly or "flip" from its normal relation, which is usually concaved, to a convexed relation or position, if the pressure within the container were substantially equal to that of the atmosphere. In other words, if the container instead of having a vacuum therein equivalent to seven inches of mercury has a zero vacuum or atmospheric pressure, the closure "flips" or convexes upon the application of four inches or more of applied external force in the form of reduced pressure or partial vacuum, the pressure represented by the four inches of mercury being that actually necessary to distort the material, usually metal, of the flexible section. Therefore, the normal closure of a container having seven inches of vacuum therein would "flip" at four plus seven or a total of eleven inches of the externally applied vacuum. It is desired to select automatically from a series of containers normally having seven inches or more of internal vacuum, all containers having zero vacuum or those known as "leakers", meaning those which have taken in a sufficient amount of atmospheric pressure to reduce the normal vacuum of seven inches to something less than seven inches and, in most cases, to zero vacuum or atmospheric pressure, which almost inevitably occurs when the containers stand a sufficient length of time before testing to permit atmospheric pressure to enter the containers through small pores or openings in the walls thereof, or by reason of other defects in the containers, or in the sealing means therefor. Ordinarily two or three inches of vacuum is allowed for commercial variations in the thickness of the metal in the container walls, such as the closure elements, so that, in order to separate the containers having no vacuum or an excessive internal pressure, the degree of vacuum applied to the closure elements by the vacuum chambers 80 should be four plus three or seven inches of mercury. It will be appreciated that the amount of external vacuum or applied reduced pressure required to "flip" the flexible portions of the containers depends upon several factors, such as the thickness and character of the material, whether the same has been heat treated or annealed, the contour markings on its surface, the effect of the impact of the contour marking dies, etc. It is, therefore, necessary in adjusting the machines for testing containers of this specific character to make certain simple preliminary tests to determine the amount of vacuum required to "flip" the flexible section or closure of each particular type of container having high internal fluid pressure or substantially low vacuum. On the basis of the facts hereinbefore assumed, it will require seven plus four plus three, or fourteen inches or more of externally applied vacuum to "flip" the closure of a container having a seven inch normal internal vacuum. Therefore, if a vacuum of ten or twelve inches is applied to the closures of the containers, only those that are under seven inches internal vacuum will "flip". It may be found that in certain types of containers, the flexible sections, such as the end closures, will not produce the hereinbefore described "flip" but will, nevertheless, move an appreciable amount when subjected to a vacuum or reduced fluid pressure externally applied, and the apparatus will operate effectively even when the movements of the closures under the differential applied pressure is very slight, as the mechanism may be adjusted to respond to a very small movement of the closure.

In the commercial tin can or container for foodstuffs and the like, it has been found that the flexible sections, such as the closures, of the same side, dimensions and material will require the application of different degrees of force to cause them to move or bulge and it has been found that, by repeatedly "flipping" the closures or flexible sections, the strains or variables therein may be eliminated or reduced to a relatively constant figure, so that under the same conditions all of the closures will operate in exactly the same way. The number of "flips" required to reduce the flexible sections to a relatively constant uniform degree of flexibility, so that they will always respond or "flip" under a given uniform pressure, may be determined by a series of simple tests upon a few of the closures selected at random, so that the number of preliminary "flips" to be applied by the machine may be determined. For example, in a series of container closures, it may be found that on the average a vacuum of eleven inches of mercury is required to "flip" the closure the first time, that nine inches will "flip" them the second time and so on until the average is reduced by repeated "flippings" until a point is reached where the flexibility of the closures appears to be constant and additional "flips" will not materially effect the average. In testing the internal fluid pressure in a series of containers, it is highly desirable to have the flexible sections of the containers all "flip" at a constant figure or degree of applied pressure or external vacuum and it is for this purpose that the preliminary "flipping"

operations are made an essential function of the present machine.

The operation of the machine herein illustrated is as follows: The containers to be tested are either delivered automatically to the inlet conveyer chute 182, as by a suitable conveyer, or they may be fed into the inlet chute by hand, the containers being delivered by the chute one at a time to the pockets 63 carried by the rotating drum, which latter may be operated at a relatively high speed, the individual containers being accurately guided into the pockets by the bridge piece 196 and the side guides 193, the abutment 189' on the lever 189 serving to separate the particular container entering a pocket 63 from the next container in the series, thereby obviating any tendency of the containers to choke in the feed chute.

As each container is moved upwardly from the supply chute by the rotation of the drum, the plunger in alignment with the pocket in which the particular container is located is moved transversely of the drum by the coaction of the roller on the plunger and the circular cam track, thereby causing the plunger to engage the container and move the same in the pocket until the closure end of the container is forced into fluid tight engagement with the gasket 100 of the corresponding vacuum chamber 80. The movement of the container by the plunger causes the closure of the container to engage the stems 94 of the valves 93 in the vacuum chamber to unseat the valves. Shortly after the engagement of the container with the vacuum chamber, the locking finger 120 carried by the vacuum chamber engages the cam 125 and is moved out of cooperative engagement with lever 106, so that the latter is free to rock in its bearings. Further rotation of the drum brings the port 134 of the particular vacuum chamber 80 into registry with port 152 in the distributing valve 135, which port connects by the arcuate duct 151 with port 150, which, in turn, is connected by piping 170 directly with the fluid pressure pump which exhausts the air from the vacuum chamber to a sufficient extent to cause the closure of the container to "flip" or move outwardly. The port 152 then passes out of registry with port 134 and port 152' in the valve passes into registry with the port 134 and establishes communication between the vacuum chamber and the atmosphere, thereby restoring the normal atmospheric pressure in the vacuum chamber and causing the closure of the container to move in the reverse direction or back to normal. This operation is repeated by the alternate connection of the vacuum chamber with the pump and with the atmosphere by way of ports 153 and 153', 154 and 154', 155 and 155', thereby causing successive vibrations of the closure of the container which are effective to reduce the flexibility of the closure to a desired average, so that, when all of the closures have been subjected to these successive preliminary "flippings" or vibrations, the resiliency or flexibility of all of the closures will be substantially uniform. While each of the "flipping" operations will cause the corresponding pin 84 carried by the vacuum chamber to reciprocate and, therefore, to rock the corresponding lever 106, this rocking action is ineffective, inasmuch as the locking finger 120 is held out of engagement with the latch plate 117 carried by the member 116 on the end 106' of lever 106, by the engagement of the finger 120 with the cam 125. After the last "flipping" operation has been completed, the locking finger 120 passes out of engagement with cam 125 and is moved by spring 122 back into operative engagement with the latch plate 117 carried by the lever 106. Further rotatory movement of the drum carries port 134 connected to the particular vacuum chamber into alignment with port 160 of valve 135 and establishes communication by pipe 175 with tank 173 in which a predetermined degree of pressure below atmosphere or partial vacuum is constantly maintained by the pressure regulator 172, thereby applying this predetermined vacuum or reduced pressure to the vacuum chamber 80 and to the closure of the container in sealed engagement with the vacuum chamber, said reduced pressure being approximately equal to that represented by twelve inches of mercury in a standard vacuum gauge, when the apparatus is adjusted to test containers of the character hereinbefore described, which require a reduced pressure or partial vacuum equal to about fourteen inches of mercury applied to the closure to cause the latter to "flip" or move outwardly, when the degree of vacuum in the container equals about seven inches of mercury. If the degree of vacuum or internal pressure in the container is normal or approximately normal, no movement of the closure results and the container is passed through the machine, and is ultimately delivered to and discharged from the upper section 183 of the discharge chute. If, however, the internal pressure of the container is high, or the vacuum therein is deficient, the closure of the container is "flipped" or caused to move outwardly, by the predominant pressure in the container over that in the vacuum chamber and the outward movement of the closure causes the latter to engage the pin 84 in the vacuum chamber, moving said pin outwardly until it engages the set screw 106" carried by lever 106, thereby rocking the lever and depressing the end 106' thereof until the detent 117 passes below the locking finger 120 and the latter is moved by its spring 122 to lock the lever in its projected position. The continued rotation of the drum carries the locked lever 106 until its outer end engages shoe 230, as illustrated in Figs. 16 and 19, and the wiping contact between the end of the lever and the shoe moves the stem 236, to rock the shaft 223, thereby swinging the locking levers 220 out of engagement with the vertical arms 217 of the pivoted gate members 212, thereby unlocking both gate members, which, however, are still held in their closed position by the springs 215. Before the particular vacuum chamber reaches the proximity of the discharge chute, ports 161, 163 and 165 have successively established communication between the vacuum chamber and the atmosphere and the roller 70 carried by the plunger has passed into engagement with the low section of the cam ring 76 and withdrawn the plunger from engagement with the receptacle, so that the springs carried by the stems 94 of the valve 93 are effective to force the receptacle out of engagement with the sealing ring of the vacuum chamber, at which time the receptacle is still held in position in the pockets by the arcuate guide 241. When the defective container is opposite the inlet of the discharge chute, it rolls by gravity, or encounters the abutment 198 and is forced over the bridge piece 242, into the mouth of the discharge chute, where it is directed by the side guides 206 onto the tracks on each side of the upper section of the discharge chute and thence onto the gate members 212 where the weight of the receptacle will cause the gate members to swing downward against the tension of their springs, causing the defective container to drop into the lower section 184 of the discharge chute, the gate members being immediately swung back to horizontal position by their springs 213. The particular pocket from which the defective receptacle has been discharged then moves upward to receive another container from the inlet chute 182. Meanwhile, the lever 106 carried by the vacuum chamber is moved out of engagement with the shoe 230 and shortly thereafter the locking finger 120, which has held the lever in its projected relation, engages the cam 125 and is thereby moved out of engagement with the detent 117 carried by the lever, permitting the latter to be moved by spring 113 to its normal position. This particular sequence of operations is carried out with each of the receptacles delivered to the respective pockets on the drum, namely, the receptacles are fed to and properly positioned within the pockets and then moved by the plungers into engagement with the corresponding vacuum chambers, the locking fingers 120 swung out of cooperative relation with the ends of levers 106, the series of vibrations or "flips" applied to the closures of the receptacles in the pockets by alternately connecting the respective vacuum chambers with the fluid pressure exhausts pump and the atmosphere to standardize the resiliency of the closures, after which the locking fingers 102 are restored to cooperative relation with the lever 106, by disengagement of such fingers with the cam 125, which is followed by the application of the test reduced pressure to the vacuum chambers by establishing communication between the same and the tank 173, which reduced pressure is sufficient to cause the closures of the containers that are deficient in internal vacuum to move outwardly and cause pins 84 to rock levers 106, which are locked in this position by fingers 120 and remain in this locked position to engage shoe 230 and unlock the gates 212 of the discharge chute, the levers 106 being finally released by the engagement of fingers 120 with the cam 125, the normal or atmospheric pressure being restored in the respective vacuum chambers some little time before the chambers and the containers in corresponding drum pockets come opposite the inlet of the discharge chute.

It will be understood that the machine, as illustrated and described, is adapted to a particular type of container and is, therefore, merely exemplary of one form of the invention, which latter is, however, adapted by suitable modification to receptacles of various sizes, shapes and materials, provided with flexible sections adapted to be brought into sealing engagement with appropriately formed vacuum chambers.

What I claim is:

1. A machine for testing sealed containers having flexible sections, comprising means for repeatedly flexing said sections to substantially standardize the resiliency thereof, means for effecting a final outward movement of said sections in containers having vacuum deficiencies, and means controlled by said final movement to segregate the containers from those having normal internal pressures.

2. A machine for testing sealed containers having flexible closures, comprising means for repeatedly flexing said closures to substantially standardize the resiliency thereof, means for effecting a final outward movement of said closures in containers having vacuum deficiencies, and means controlled by the said final movement of the closures to segregate the containers from those having normal internal pressures.

3. A machine for testing the vacuum in containers having flexible sections, comprising a chamber with which the containers are engaged in sealed relation, means for successively reducing and restoring the fluid pressure in said containers to repeatedly flex said sections and for finally reducing said pressure to cause only the flexible sections of containers having vacuum deficiencies to move, and means controlled by the latter movement to segregate said containers from those having normal vacuum conditions.

4. A machine for testing sealed containers having flexible sections, comprising means for supplying and moving a series of containers in a continuous path, means for successively reducing and restoring external fluid pressure on said flexible sections of each container to repeatedly flex the sections and for finally reducing said pressure to cause only the flexible sections of containers having vacuum deficiencies to move, and means controlled by the latter movement to segregate said containers from those having normal vacuum conditions.

5. A machine for testing sealed containers having flexible sections, comprising means for successively and repeatedly subjecting the containers to reduced and to atmospheric pressure to first flex the sections and then test the pressure in the containers, mechanism actuated by the movement of said sections to segregate the containers having vacuum deficiencies, and means for rendering said mechanism ineffective during the first or flexing movements and operative during the testing operation.

6. A machine for testing sealed containers having flexible sections, comprising means for supporting and moving a series of containers in a continuous path, means for successively and repeatedly subjecting the containers to reduced and to atmospheric pressure to first flex the sections and then test the pressure in the containers, mechanism actuated by the movement of said sections to segregate the containers having vacuum deficiencies, and means for rendering said mechanism ineffective during the first or flexing movements and operative during the testing operation.

7. A machine for testing sealed containers having flexible sections, comprising a rotary drum, means carried thereby for supporting a series of containers, means for successively and repeatedly subjecting the containers to reduced and to atmospheric pressure to first flex the sections and then test the pressure in the containers, mechanism actuated by the movement of said sections to segregate the containers having vacuum deficiencies, and means for rendering said mechanism ineffective during the first or flexing movements and operative during the testing operation.

8. A machine for testing sealed containers having flexible sections, comprising a drum rotating about a horizontal axis and having a peripheral series of container receiving pockets, means carried by the drum for subjecting the containers successively and repeatedly to reduce fluid pressure and to atmospheric pressure to first flex the sections and then to test the pressure in the containers, means associated with the drum for moving the containers in the pockets successively into engagement with the reduced pressure applying means, and means controlled by the movements of the walls of containers having vacuum deficiencies under the testing operations to segregate said containers from those having normal vacuum conditions.

9. A machine for testing sealed containers having flexible sections, comprising a drum rotating about a horizontal axis and having a peripheral series of container receiving pockets, chambers carried by the drum in axial alignment with said pockets and adapted to be engaged by said containers to repeatedly subject the latter to reduced fluid pressure and to atmospheric pressure to first flex the sections and then test the pressure in the containers, means for moving the containers in the pockets into sealed engagement with said chambers, and means controlled by the movement of the walls of containers having vacuum deficiencies under the testing operations to segregate said containers from those having normal vacuum conditions.

10. A machine for testing sealed containers having flexible sections, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers to act on the flexible sections of said containers to first flex the sections and then test the pressure in the containers, and means controlled by the movement of the sections of containers having vacuum deficiencies under the testing operations to segregate said containers from those having normal vacuum conditions.

11. A machine for testing sealed containers having flexible sections, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers to first flex the sections and then test the pressure in the containers, movable abutments carried by said chambers and actuated by the movement of the walls of the containers, mechanism actuated by the movable abutments to segregate the containers having vacuum deficiencies, and means for rendering said mechanism ineffective during the first or flexing operations and operative during the testing operation.

12. A machine for testing sealed containers having flexible sections, comprising a drum rotating about a horizontal axis and having a peripheral series of container receiving pockets, chambers carried by the drum in axial alignment with said pockets, means for moving the containers in said pockets into engagement with the chambers, means for successively inducing and relieving fluid pressure in said chambers to first flex the sections and then test the pressure in the containers, pins carried by said chambers and advanced by the outward movement of the container sections, mechanism actuated by the pins for segregating containers having vacuum deficiencies, and means for rendering said mechanism ineffective during the first or flexing movements of the container sections and operative during the testing operation.

13. A machine for testing sealed containers, comprising a drum rotating about a horizontal axis and having a peripheral series of container receiving pockets, chambers carried by the drum in axial alignment with said pockets, means for moving the containers in said pockets into engagement with the chambers, means for successively inducing and relieving fluid pressure in said chambers to first flex the sections and then test the pressure in the containers, pins carried by said chambers and advanced by the outward movement of the sections of the containers, levers operated by said pins, means for locking the levers in advanced position, mechanism operated by the locked levers for segregating the containers having vacuum deficiencies, and means for rendering the locking means operative only during the testing operation.

14. A machine for testing sealed containers, comprising a drum rotating about a horizontal axis and having a peripheral series of container receiving pockets, chambers carried by the drum in axial alignment with said pockets, means for moving the containers in said pockets into engagement with the chambers, means for successively inducing and relieving fluid pressure in said chambers to first flex the sections and then test the pressure in the containers, pins carried by said chambers and advanced by the outward movement of the sections of the containers, levers operated by said pins, spring fingers for locking said levers in advanced position, mechanism actuated by said levers when locked for segregating the containers having vacuum deficiencies, and means for moving the spring fingers to inoperative relation during the preliminary flexing operations.

15. A machine for testing sealed containers, comprising a drum rotating about a horizontal axis and having a peripheral series of container receiving pockets, a feed chute for delivering and positioning containers in said pockets, chambers carried by the drum in axial alignment with said pockets, means for moving the containers in said pockets into engagement with the chambers, means for successively inducing and relieving fluid pressure in said chambers to first flex the sections and then test the pressure in the containers, projectable means carried by said chambers operated by the movement of the flexible sections of the containers, locking means for the projectable means, means to render the locking means ineffective during the preliminary flexing operations, a discharge chute having a movable gate to permit the containers to drop through the bottom of the chute, means for locking the gate, and an abutment engaged by the projectable means when the latter is locked to release the gate locking means and permit a defective container on the gate to open the latter.

16. A machine for testing sealed containers, comprising a drum rotating about a horizontal axis and having a peripheral series of container receiving pockets, a feed chute for delivering and positioning containers in said pockets, chambers carried by the drum in axial alignment with said pockets, means for moving the containers in said pockets into engagement with the chambers, means for successively inducing and relieving fluid pressure in said chambers to first flex the sections and then test the pressure in the containers, projectable means carried by said chambers operated by the movement of the flexible sections of the containers, locking means for the projectable means, means to render the locking means ineffective during the peliminary flexing operations, a discharge chute having a movable gate to permit the containers to drop through the bottom of the chute, a pivoted lever locking the gate in closed position, a shoe connected to the lever and engaged by the projectable means when the latter is locked to move the lever and permit a defective container on the gate to open the latter.

17. A machine for testing sealed containers, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers, movable abutments carried by said chambers and actuated by the movement of the walls of containers having vacuum deficiencies, levers actuated by the abutments, means for locking said levers in advanced position, a discharge chute having a movable gate to permit the containers to drop through the bottom of the chute, means for locking the gate, and an abutment engaged by the locked levers to release the gate locking means and permit a defective container on the gate to open the latter.

18. A machine for testing sealed containers, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers, movable abutments carried by said chambers and actuated by the movement of the walls of containers having vacuum deficiencies, levers actuated by the abutments, means for locking said levers in advanced position, a discharge chute having a movable gate to permit the containers to drop through the bottom of the chute, a pivoted lever locking the gate in closed position, a shoe connected to the lever and engaged by the locked abutment actuated levers to release the gate locking levers and permit a defective container on the gate to open the latter.

19. A machine for testing sealed containers, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers, movable abutments carried by said chambers and actuated by the movement of the walls of containers having vacuum deficiencies, levers actuated by the abutments, means for locking said levers in advanced position, a discharge chute having upper and lower sections, a movable gate between the sections to permit the containers to drop into the bottom chute section, means for locking the gate, and an abutment engaged by the locked levers to release the gate locking means and permit a defective container on the gate to open the latter.

20. A machine for testing sealed containers, comprising a drum rotating about a horizontal axis and having a peripheral series of container receiving pockets, chambers carried by the drum in axial alignment with said pockets, means for moving the containers in said pockets into engagement with said chambers, means for successively inducing and relieving reduced fluid pressure in said chambers, movable abutments carried by said chambers and actuated by the movement of the walls of containers having vacuum deficiencies, levers actuated by the abutments, means for locking said levers in advanced position, a discharge chute having upper and lower sections, a movable gate between the sections to permit the containers to drop into the bottom chute section, a pivoted lever locking the gate in closed position, a shoe connected to the lever and engaged by the locked abutment actuated levers to release the gate locking levers and permit a defective container on the gate to open the latter.

21. The improvement in the method of testing the fluid pressure in containers having flexible sections, which comprises repeatedly and successively subjecting said sections to reductions and restorations of extraneous pressure sufficient to cause said sections to flex repeatedly; whereby the resiliency of said sections is substantially equalized.

In testimony whereof I affix my signature.

FRANCIS H. LANDRUM.